N. JONES.
Hernial-Trusses.
No. 155,030.                        Patented Sept. 15, 1874.
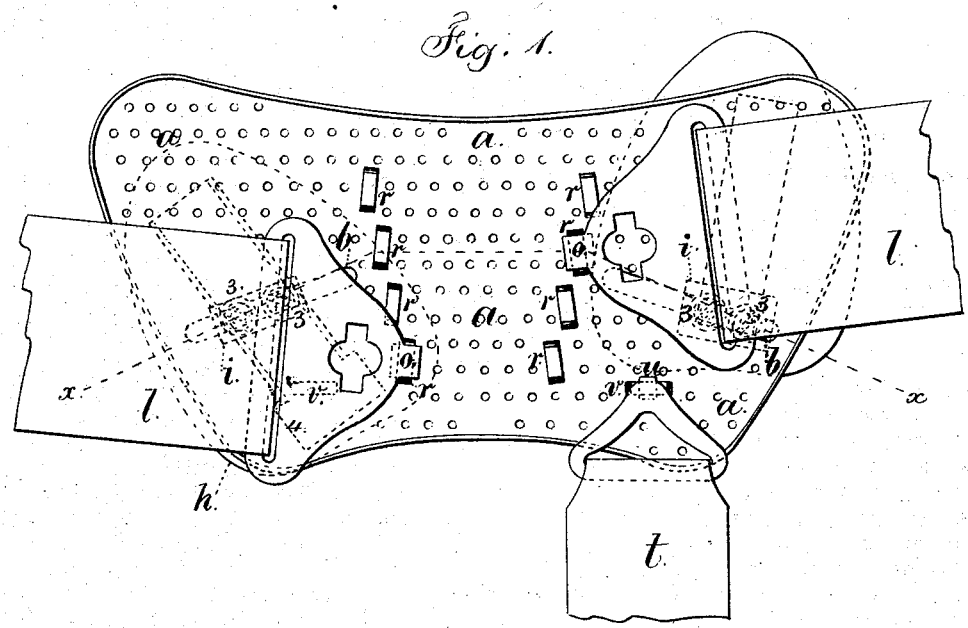
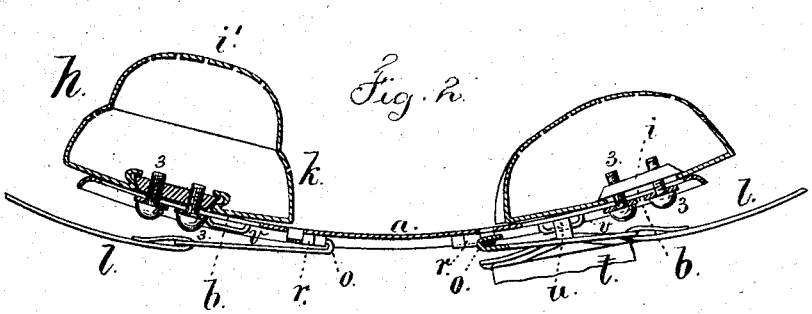
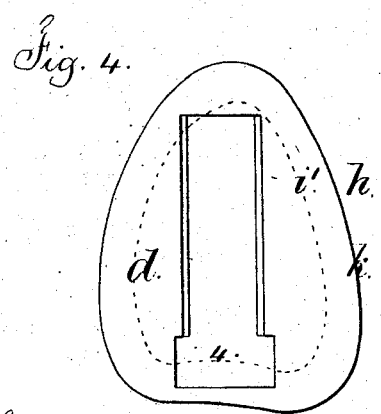
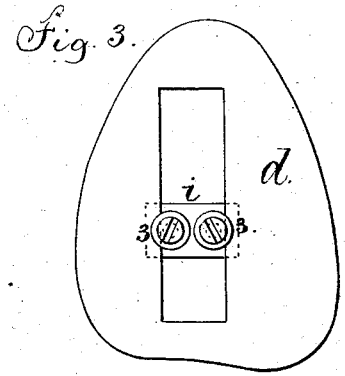
Witnesses:
Chas. H. Smith
Geo. T. Pinckney
Inventor:
Nathaniel Jones
per L. W. Serrell
atty.

UNITED STATES PATENT OFFICE.

NATHANIEL JONES, OF SYRACUSE, NEW YORK.

IMPROVEMENT IN HERNIAL TRUSSES.

Specification forming part of Letters Patent No. 155,030, dated September 15, 1874; application filed February 24, 1874.

*To all whom it may concern:*

Be it known that I, NATHANIEL JONES, of Syracuse, in the county of Onondaga and State of New York, have invented an Improvement in Hernial Trusses, of which the following is a specification:

This truss is made with one or two movable pads, each of which is secured by a nut having two screws passing through a slot in the plate; and said nut is within a mortise or opening in the back plate of the pad, running at right angles, or nearly so, to the slot in the plate, so that the pad can be positioned upon any required part of the plate, and can be clamped by tightening the screw. The straps are connected to the truss-plate at the back, and there are four or more points of attachments upon the back of the plate, so as to allow the point of attachment to be varied in order that the pressure from the strap may be applied at the point required, according to the position of the pad.

In hernias it is usually preferable to employ a pad that is small enough to press into the cavity of the rupture; but a pad of this character does not take a proper bearing upon the flesh surrounding the hernial cavity. I make the pad with a presser to enter the cavity and an enlarged base to bear against the fleshy portion of the body adjacent to the cavity, for the double purpose of supporting the hernia and preventing the pressure being too great upon the skin, the bearing being also taken upon the portion around the hernial cavity.

In the drawing, Figure 1 is a rear view of the truss, showing the attaching-straps and truss-plate. Fig. 2 is a section at the line $x\ x$. Fig. 3 is a rear view of one of the pads, and Fig. 4 is a similar view of the other pad.

The plate $a$ is preferably of metal, with the edges turned backwardly, as shown, and the plate, when perforated, allows perspiration to pass away freely. The slots $b\ b$ in the plate $a$ are to be at right angles, or nearly so, to the slots in the pads hereafter mentioned. They are shown in a direction generally lengthwise or horizontal, and preferably slightly inclined. Each truss-pad is made with a flat or nearly flat back, $d$, that is provided with a slot or mortise, into which passes the nut $i$, having in it two screws, 3 3, that pass through the slot $b$, and the ends of the nut rest against the inner surface of the back plate $d$ near the edges of the slot, and serve to confine the pad securely to the truss-plate by tightening the screws 3 3. These screws 3 connect the nut to the truss-plate so that it cannot turn; but the nut can be moved to either end of the slot in $d$ and the pad moved either way upon the nut, so that the pad may be placed in any desired position upon the plate and there secured by tightening the screw. The opening in the back of the pad may be made with folded edges, formed by bending the sheet metal back, as seen in Fig. 4, or else the edges may be plain, as in Fig. 3. In either case the pad may be set over the nut, which is longer than it is wide, and turned around to bring the plate behind the ends of the nut, so that the nut is within the pad, or else the plate may be made with a wider portion in the slot, as at 4, to allow for passing the nut into place. The slot in the pad is to run lengthwise when the slot in the plate is in the position shown; but when the slot in the pad runs crosswise the slot in the plate will run up and down.

It is preferable to make the nut with two screws, to prevent the nut turning; but if the nut has projections entering the slot $b$, one screw only may be employed. By making the nut longer than it is wide the pad can be disconnected without removing the screw by simply loosening such screw. This is of great advantage to the dealer, so as to vary the pad according to the hernia.

In order that the strap $l$ may draw over and press the pad properly to the hernia, I provide four or more points of attachment. This is especially necessary in cases of double rupture where one is higher than the other. The hooks $o$ of the straps $l$ are shown as passing into the loops $r$, and said loops are pressed up from the sheet metal of the plate. These loops may be upon the back plate of the pad, so as to form four or more points of attachment for use in cases where the pad is applied without the plate $a$. These loops $r$ are in the form of a narrow strap, so that the hooks may pass behind them but not pass through to the other side of the plate, where they would be liable to press upon the person. The thighstrap $t$ is provided with a hook, $u$, at the end, that is inserted into the loop $v$ in the plate $a$. There should be two loops, one on each side, so that two straps can be employed. The pad $h$ is made with the presser portion $i'$ smaller than the base $k$, which bears upon the fleshy portion of the body, for the purposes before described.

I claim as my invention—

1. The metallic truss-plate made with two or more points of attachment at the back, for receiving the connection at the end of each strap, and allowing the position of the attachment to be varied to suit the hernia, as set forth.

2. The loops $r$, formed of a narrow band pressed up in the sheet metal of the truss-plate, for connecting the straps, as set forth.

Signed by me this 20th day of February, A. D. 1874.

NATHANIEL JONES.

Witnesses:
GEO. T. PINCKNEY,
CHAS. H. SMITH.